United States Patent
Cropp

[15] 3,704,758
[45] Dec. 5, 1972

[54] GOLF CART

[72] Inventor: David Cropp, 501 Chestnut Street, Meadville, Crawford County, Pa.

[22] Filed: May 18, 1970

[21] Appl. No.: 38,331

[52] U.S. Cl. ............180/19 R, 180/65 R, 280/DIG. 5
[51] Int. Cl. ..........................................B62d 51/04
[58] Field of Search........180/19 R, 19 H, 19 S, 65 R, 180/27; 200/157

[56] References Cited

UNITED STATES PATENTS

| | | | |
|---|---|---|---|
| 659,729 | 10/1900 | Eaton | 180/65 X |
| 2,903,082 | 9/1959 | Marcus | 280/DIG. 5 |
| 2,706,008 | 4/1955 | Voigt | 180/19 S |
| 2,399,605 | 4/1946 | Schroeder | 180/19 H X |
| 3,123,173 | 3/1964 | Jacobs | 280/DIG. 5 |
| 3,190,994 | 6/1965 | Becker et al. | 200/157 |
| 3,370,667 | 2/1968 | Bishop | 180/65 X |

*Primary Examiner*—Leo Friaglia
*Assistant Examiner*—John A. Pekar
*Attorney*—Charles L. Lovercheck

[57] ABSTRACT

The disclosure shows a vehicle suitable for carrying golf bags. The vehicle has two motor driven wheels, having permanent field motors connected in series so that in turning, one wheel can slow up or stop while the other wheel continues to rotate and thus drive the vehicle. The armature of one motor, while rotating, limits the current through the stalled motor so that the stalled motor does not overheat. The vehicle has self-contained multi-celled batteries which are connected to the motors through a tap changing switch on the handle. The vehicle has a third wheel which supports the back of the vehicle and the operator can hold onto the handle and thereby be pulled along.

2 Claims, 2 Drawing Figures

PATENTED DEC 5 1972

3,704,758

INVENTOR.
DAVID CROPP

GOLF CART

STATEMENT OF INVENTION

This invention relates to golf carts and, more particularly, to the type of golf cart used on golf links and the like.

OBJECTS OF THE INVENTION

It is an object of the invention to provide an improved golf cart.

Another object is to provide a vehicle wherein the wheels are each driven by a motor and the motors are connected in series with each other.

Another object is to provide an improved vehicle drive.

Another object is to provide an improved variable speed control on a golf cart.

DETAILED DESCRIPTION OF THE DRAWINGS

Figure 1:
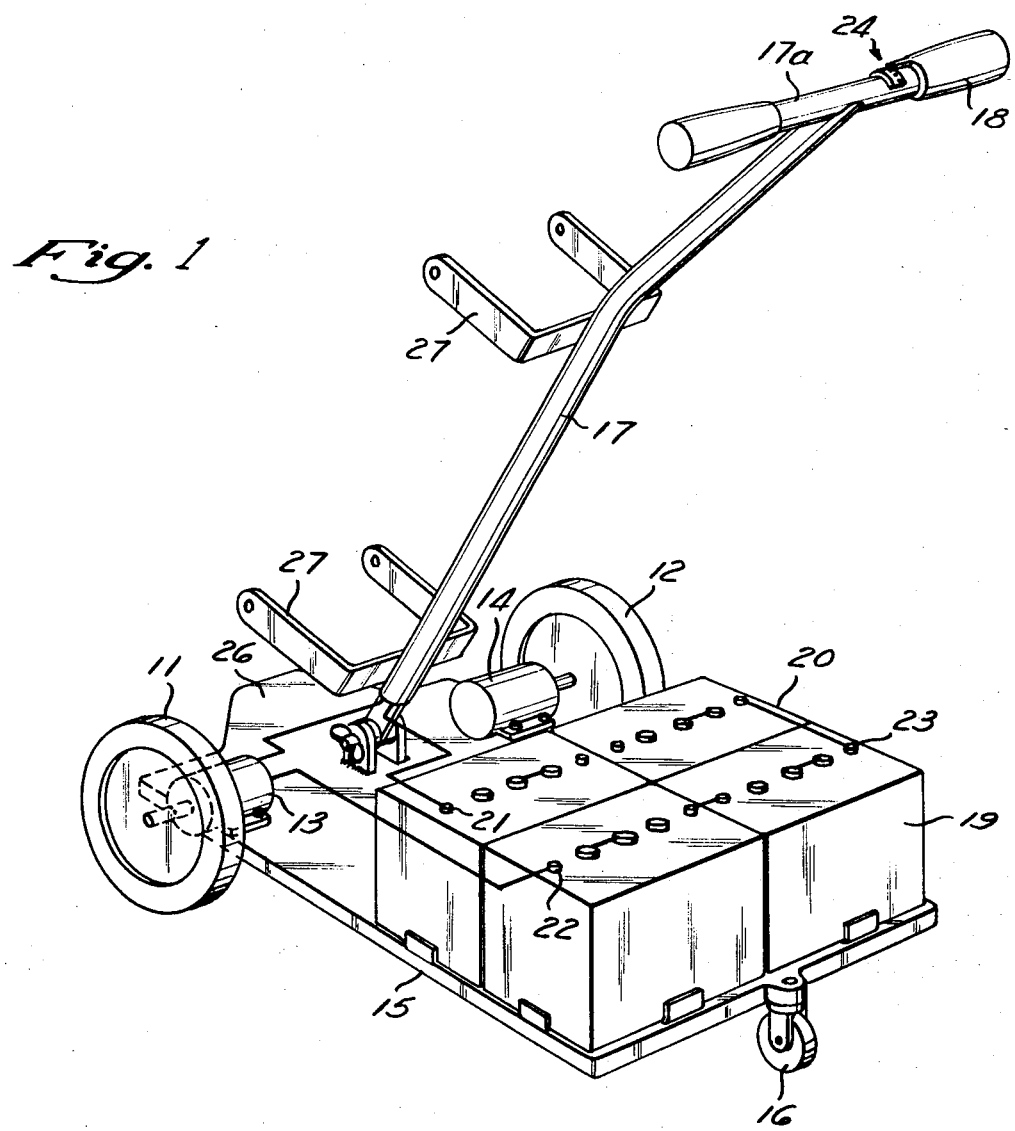
FIG. 1 shows an isometric view of the golf cart according to the invention.
Figure 2:
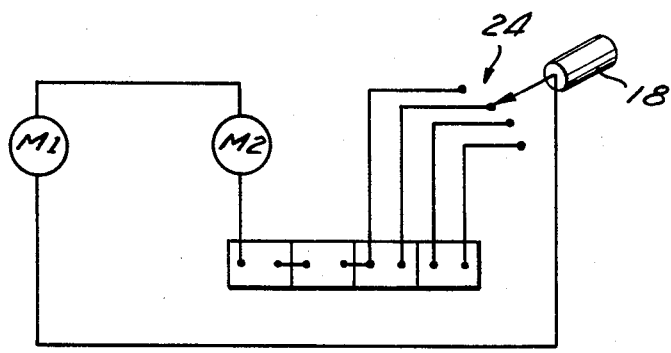
FIG. 2 shows a wiring diagram of the golf cart.

Now with more particular reference to the drawings, the golf cart is indicated generally at 10. It has ground engaging wheels 11 and 12 driven by motors 13 and 14. The golf cart has a frame 15 which is supported at its rear by a caster wheel 16 and a handle 17, with a cross member 17a, and is swingably supported on the golf cart. The handle has a rotating grip 18 which has a multi-terminal switch built in it which connects a part of one of the batteries out of the circuit to change voltage and the speed of the golf cart. The batteries are indicated at 19 and 20. They may be a suitable kind of lead acid, or other suitable storage battery. The batteries have terminals 21, 22 and 23, and may have as many as desired, which are connected by the switch 24 to motors 13 and 14 so that the speed of the motors can be changed.

The cart has a support for a golf bag to rest on support 26 with the top of the bag attached to a bracket 27. A strap may be provided to hold the golf bag in place.

In operation, the operator can hold onto the grip 18 and increase or decrease the speed of the cart. Thus the operator can allow the cart to pull him along and thus aid him in moving up hills which are found on golf courses. The game of golf can thus be made more pleasant and less exhausting especially on hilly courses, thus encouraging a person to walk, providing the beneficial walking exercise without the laborious cart pulling effort.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A vehicle comprising a frame,
   at least two support engaging wheels,
   at least two electric motors, each said motor being connected to a said wheel,
   means electrically connecting the armatures of said motors in series with each other and in series with a power supply,
   and speed control means for controlling the speed of said motors,
   said power supply comprises at least one storage battery,
   and means supporting said battery on said frame,
   said vehicle having at least one caster wheel for supporting a part of the weight of said frame and said batteries,
   said vehicle having a handle swingably attached thereto,
   and a hand engaging grip attached to said handle,
   and means for supporting a golf bag mounted on said handle,
   and means on said grip for controlling the speed of said motors.

2. The vehicle recited in claim 1 wherein a selector switch is provided on said vehicle connecting said battery to said motor,
   and said grip is connected to said selector switch whereby said grip can be moved for connecting different terminals of said battery to said motors whereby the voltage applied to said motor can be changed.

* * * * *